United States Patent
Martins Rodrigues et al.

(10) Patent No.: US 11,194,724 B2
(45) Date of Patent: *Dec. 7, 2021

(54) PROCESS DATA CACHING THROUGH ITERATIVE FEEDBACK

(71) Applicant: INTERNATIONAL BUSINESS MACHINES CORPORATION, Armonk, NY (US)

(72) Inventors: Mauro Sergio Martins Rodrigues, Campinas (BR); Rafael Camarda Silva Folco, Santa Bárbara d'Oeste (BR); Daniel Battaiola Kreling, Santa Bárbara d'Oeste (BR); Breno H. Leitao, Araraquara (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/587,888

(22) Filed: Sep. 30, 2019

(65) Prior Publication Data
US 2020/0026652 A1    Jan. 23, 2020

Related U.S. Application Data

(63) Continuation of application No. 16/010,674, filed on Jun. 18, 2018, now Pat. No. 10,467,141.

(51) Int. Cl.
*G06F 12/0862* (2016.01)

(52) U.S. Cl.
CPC .. *G06F 12/0862* (2013.01); *G06F 2212/1024* (2013.01); *G06F 2212/602* (2013.01)

(58) Field of Classification Search
CPC ...... G06F 12/00; G06F 12/08; G06F 12/0893; G06F 12/0864; G06F 12/0862;
(Continued)

(56) References Cited

U.S. PATENT DOCUMENTS 5,396,604 A    3/1995    DeLano et al.
5,774,685 A    6/1998    Dubey
(Continued)

OTHER PUBLICATIONS

Kowarschik et al. "An Overview of Cache Optimization Techniques and Cache—Aware Numerical Algorithms", http://www.cc.gatech.edu/~bader/COURSES/UNM/ece637-Fall2003/papers/KW03.pdf, Algorithms for Memory Hierarchies, vol. 2625 of the series Lecture Notes in Computer Science pp. 213-232, Feb. 28, 2003, 23 pages.
(Continued)

*Primary Examiner* — Andrew J Cheong
(74) *Attorney, Agent, or Firm* — Erik C Swanson; Andrew D. Wright; Roberts Calderon Safran & Cole, P.C.

(57) ABSTRACT

Systems and methods for improved process caching through iterative feedback are disclosed. In embodiments, a computer implemented method comprises retrieving updated metadata of a process to be executed, wherein the updated metadata includes information regarding cache misses from a prior execution of the process; automatically modifying a setting of a data stream control register based on the updated metadata; automatically setting a hint at a data cache block touch module; performing an initial execution of the process after the steps of retrieving the updated metadata, automatically modifying the setting of the data stream control register, and automatically setting the hint at the data cache block touch module; and modifying the updated metadata of the process after the execution of the process based on cache miss statistical data gathered during the execution of the process, to produce newly updated metadata.

20 Claims, 3 Drawing Sheets

(58) Field of Classification Search
CPC ........... G06F 9/3824; G06F 2212/6082; G06F 2212/601; G06F 2212/6022; G06F 2212/6032; G06F 2212/1021; G06F 2212/1028; G06F 2212/1024; G06F 2212/602; G06F 9/3806; G06F 9/3832; G06F 9/38; G06F 9/34; G06F 12/06; G06F 2212/451
See application file for complete search history.

(56) References Cited

U.S. PATENT DOCUMENTS

| | | | |
|---|---|---|---|
| 6,047,363 A | 4/2000 | Lewchuk | |
| 6,134,710 A | 10/2000 | Levine et al. | |
| 6,560,693 B1* | 5/2003 | Puzak | G06F 9/383 |
| | | | 712/205 |
| 6,681,297 B2 | 1/2004 | Chauvel et al. | |
| 7,650,464 B2 | 1/2010 | Liu et al. | |
| 7,784,042 B1* | 8/2010 | Lobo | G06F 8/4441 |
| | | | 717/159 |
| 7,809,883 B1 | 10/2010 | Fair et al. | |
| 9,304,773 B2 | 4/2016 | Scott et al. | |
| 9,348,753 B2 | 5/2016 | McCauley | |
| 9,547,591 B1* | 1/2017 | Natanzon | G06F 9/45558 |
| 9,569,219 B2 | 2/2017 | Lin | |
| 2002/0144062 A1* | 10/2002 | Nakamura | G06F 9/383 |
| | | | 711/137 |
| 2004/0044847 A1* | 3/2004 | Ray | G06F 9/30047 |
| | | | 711/122 |
| 2005/0154838 A1 | 7/2005 | DeWitt, Jr. et al. | |
| 2005/0154839 A1 | 7/2005 | DeWitt, Jr. et al. | |
| 2006/0059311 A1 | 3/2006 | Van De Waerdt et al. | |
| 2007/0204108 A1* | 8/2007 | Griswell | G06F 12/0862 |
| | | | 711/137 |
| 2008/0082721 A1 | 4/2008 | Yu et al. | |
| 2008/0126751 A1* | 5/2008 | Mizrachi | H04L 49/90 |
| | | | 712/30 |
| 2009/0204765 A1* | 8/2009 | Gupta | G06F 12/127 |
| | | | 711/133 |
| 2010/0332761 A1 | 12/2010 | Li | |
| 2011/0173397 A1* | 7/2011 | Boyle | G06F 12/0862 |
| | | | 711/137 |
| 2011/0270945 A1* | 11/2011 | Shiga | G06F 3/0647 |
| | | | 709/213 |
| 2012/0102009 A1 | 4/2012 | Peterson et al. | |
| 2013/0185475 A1* | 7/2013 | Talagala | G06F 12/0866 |
| | | | 711/102 |
| 2013/0185488 A1* | 7/2013 | Talagala | G06F 12/0246 |
| | | | 711/103 |
| 2014/0240333 A1* | 8/2014 | Shirota | G09G 5/395 |
| | | | 345/531 |
| 2015/0229717 A1* | 8/2015 | Gupta | G06F 9/45558 |
| | | | 718/1 |
| 2016/0197986 A1* | 7/2016 | Chambliss | H04L 67/2861 |
| | | | 709/213 |
| 2016/0224473 A1* | 8/2016 | Acar | G06F 16/35 |
| 2016/0253261 A1 | 9/2016 | Lee et al. | |

OTHER PUBLICATIONS

Xia et al. "Instruction Prefetching of Systems Codes With Layout Optimized for Reduced Cache Misses", http://dl.acm.org/citation.cfm?id=233001, ISCA '96 Proceedings of the 23rd annual international symposium on Computer architecture, May 24, 1996, 12 pages.

Anonymous, "IBM POWER8", https://www.7-cpu.com/cpu/Power8.html, accessed, Apr. 17, 2018, 2 pages.

Anonymous, "DSCR (Data Stream Control Register)", https://www.kernel.org/doc/Documentation/powerpc/dscr.txt, accessed Apr. 17, 2018, 2 pages.

Anonymous, "Cache (computing)", https://en.wikipedia.org/wiki/Cache, Wikipedia, accessed Apr. 17, 2018, 8 pages.

Anonymous, "IBM Power ISA Version 3.0B", https://openpowerfoundation.org/?resource_lib=power-isa-version-3-0, accessed Apr. 23, 2018, 1 page.

Buros, "A Proper Use of Data Stream Control Register of POWER Processors", https://www.IBM.com/developerworks/community/wikis/home?lang=en#. . . , accessed Apr. 23, 2018, 5 pages.

Anonymous, "IBM Power ISA Version 2.07 B", https://openpowerfoundation.org/?resource_lib=ibm-power-isa-version-2-07-b, accessed Apr. 23, 2018, 2 pages.

Anonymous, "The IBM Power8 Processor Core Microarchitecture (a white paper summary with thoughts and considerations)", IBM DeveloperWorks AIX Virtual User Group webinar, Feb. 18, 2016, 126 pages.

List of IBM Patents or Patent Applications Treated as Related, dated Sep. 30, 2019, 1 page.

* cited by examiner

PROCESS DATA CACHING THROUGH ITERATIVE FEEDBACK

BACKGROUND

The present invention relates generally to data caching, and more particularly, to improved prefetch data caching through iterative feedback.

In computing, a cache is a hardware or software component that stores data so future requests for data can be served faster. A cache is made up of a pool of entries. Each entry has associated data, which may be the result of an earlier computation or the duplicate of data stored in a backing store. Each entry has a tag, which specifies the identity of the data in the backing store of which the entry is a copy. When a cache client (processor) needs to access data in the backing store, it first checks the cache. If an entry can be found in the cache with a tag matching the desired data (cache hit), the data in the cache is used instead of the data in the backing store. When the cache client cannot find an entry in the cache (i.e., the cache does not contain data with the desired tag), the cache client obtains the data (uncached data) from the backing store. A "cache hit" occurs when the cache client can find the requested data in the cache. Conversely, a "cache miss" occurs when data requested by the cache client cannot be found in the cache. The more data requests that can be served from the cache, the faster a processor performs.

A "prefetch" refers to a technique used by computer processors wherein instructions and/or data are fetched by the computer processors before they are needed during a process. A "data cache block touch" refers to processor instructions that can be used to request certain data that the computer processor is likely to use soon. Some processors support load-store instructions that imply cache hints, which are suggestions regarding a data block that will most likely be necessary soon (during processing), and should therefore be loaded into the cache beforehand (i.e., before they are actually needed).

A data stream control register (DSCR) is a special purpose register designed to provide a means to supply information and controls to a prefetch mechanism and to control prefetch settings. In one example, a DSCR has 64 bits. If the DSCR is enabled for any of its transient bits, these bits give hints to the prefetch engine that accesses are likely to be short. Other count bits are used to change the default number of units in either software or hardware streams. A depth attainment urgency field specifies how quickly the hardware-detected stream's depth can be reached. In one example, the depth attainment urgency field accepts values 0-7 that indicate one of the available urgency profiles, such as "default", "not urgent", "least urgent", "less urgent", "medium urgent", "more urgent" and "most urgent". Using the same example, a prefetch stream depth field accepts values 0-7 which correspond to one of the available profiles, such as "default", "none", "shallowest", "shallow", "medium", "deep", "deeper", and "deepest". In its deepest state, a prefetch mechanism can grab the most data on a particular pathway. In its shallowest state, the prefetch mechanism can grab the most data from a plurality of different pathways.

SUMMARY

In an aspect of the invention, a computer-implemented method includes: retrieving, by a computing device, updated metadata of a process to be executed by the computing device, wherein the updated metadata includes information regarding cache misses from a prior execution of the process; automatically modifying, by the computing device, a setting of a data stream control register of the computing device based on the updated metadata; automatically setting, by the computing device, a hint at a data cache block touch module of the computing device describing which memory block the computing device is most likely to load during the executing of the process based on the updated metadata; performing, by the computing device, an initial execution of the process after the steps of retrieving the updated metadata, automatically modifying the setting of the data stream control register, and automatically setting the hint at the data cache block touch module; and modifying, by the computing device, the updated metadata of the process after the execution of the process based on cache miss statistical data gathered during the execution of the process, to produce newly updated metadata.

In another aspect of the invention, there is a computer program product improved process caching through iterative feedback. The computer program product comprises a computer readable storage medium having program instructions embodied therewith. The program instructions are executable by a computing device to cause the computing device to: perform an initial execution of a process; collect a first set of cache miss statistical data for the process during the initial execution of the process; modify metadata of the process, after the execution of the process, based on the cache miss statistical data to produce updated metadata; automatically modify a setting of a data stream control register of the computing device based on the updated metadata; automatically set a hint at a data cache block touch module of the computing device describing which memory block the computing device is most likely to load during the executing of the process based on the updated metadata; perform a subsequent execution of the process after the steps of automatically modifying the setting of the data stream control register and automatically setting the hint at the data cache block touch module; and modify the updated metadata of the process after the subsequent execution of the process based on a second set of cache miss statistical data gathered during the subsequent execution of the process, to produce newly updated metadata.

In another aspect of the invention, there is a system for improved process caching through iterative feedback. The system includes a CPU, a computer readable memory and a computer readable storage medium associated with a computing device; program instructions to determine that a prologue module is activated; program instructions to retrieve updated metadata of a process to be executed by the computing device, wherein the updated metadata includes information regarding cache misses from a prior execution of the process; program instructions to automatically modify, by the prologue module of the computing device, a setting of a data stream control register of the computing device based on the updated metadata; program instruction to automatically set, by the prologue module, a hint at a data cache block touch module of the computing device describing which memory block the computing device is most likely to load during the executing of the process based on the updated metadata; program instructions to perform an initial execution of the process after the steps of retrieving the updated metadata, automatically modifying the setting of the data stream control register, and automatically setting the hint at the data cache block touch module; and program instructions to modify, by an epilogue module of the computing device, the updated metadata of the process after the execution of the process based on cache miss statistical data gathered during the execution of the process, to produce newly updated metadata, wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
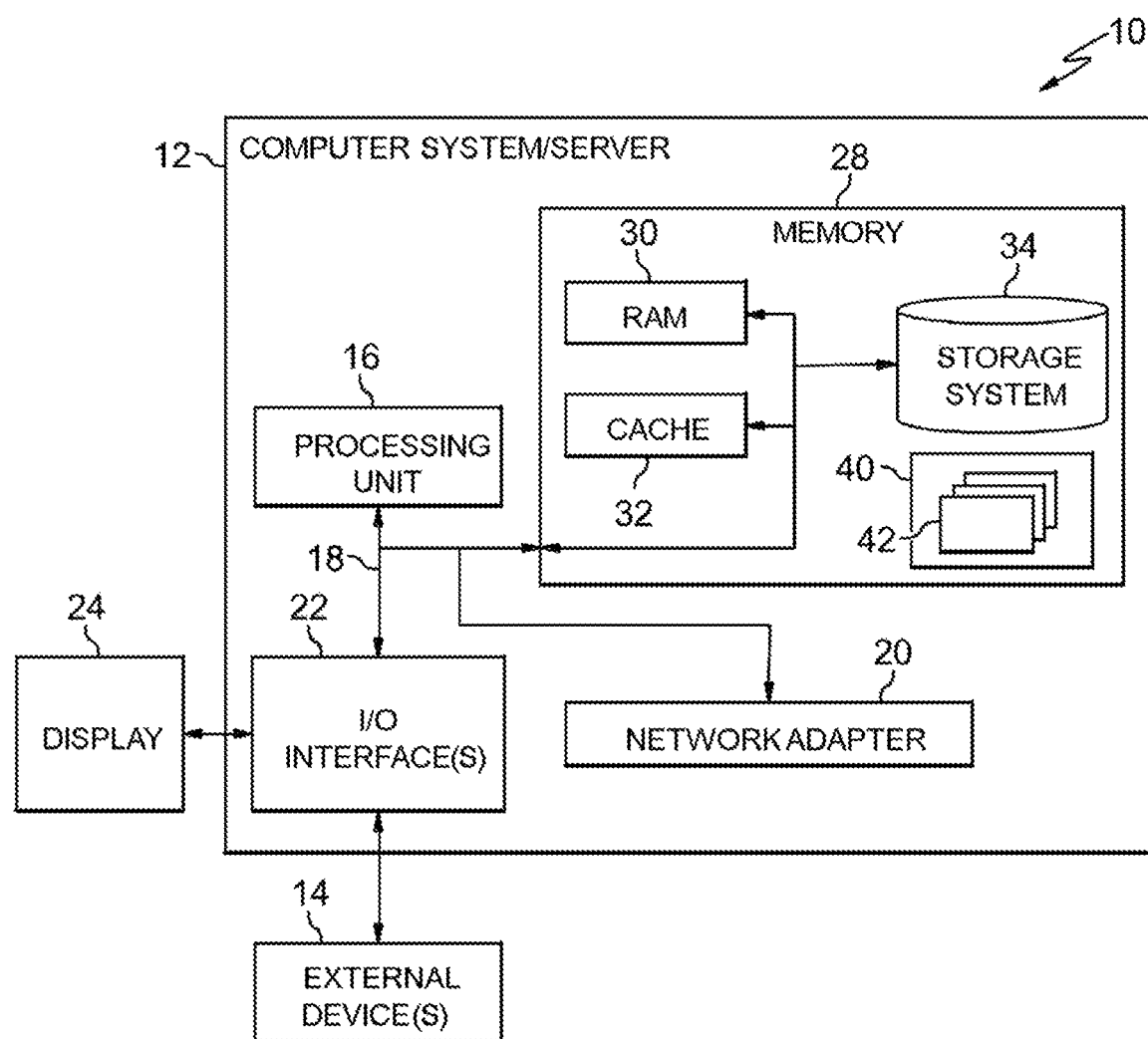
FIG. 1 depicts a computing infrastructure according to an embodiment of the present invention.

The present invention relates generally to data caching, and more particularly, to improved prefetch data caching through iterative feedback. In embodiments, a processor of the present invention enables novel prologue steps to occur prior to processing, as well as novel epilogue steps post-processing. Embodiments of the invention improve the code runtime of a process (i.e., the period during which a computer program or process is running). In aspects, a processor utilized updated metadata previously generated by the processor to statistically guess which data is most likely to be necessary during processing, and utilizes a data cache block touch (DCBT) to hint the memory prefetch in lower level caches. Additionally, a data stream control register (DSCR) can be set to increase or decrease a default prefetch depth. In aspects, the more instruction cache misses happen, the shallower the next prefetch will be. Conversely, the less instruction cache misses happen, the deeper the next prefetch will be. In embodiments, an epilogue phase comprises the analysis of the cache miss statistics from a last slice of processor execution, gathered from a performance monitoring unit (PMU). The cache miss statistical data is utilized to produce the updated metadata for future prologue phases. That is, the statistical data gathered will be merged into buffered information and the information displayed will be the arithmetic mean of the statistical data, producing an optimized prediction of the code over time.

Advantageously, embodiments of the present invention enable dynamic tuning of a processing cache, enable a user to turn on or off novel prologue and epilogue phases, and leverage cache miss statistics gathering to provide improved functionality to processors by decreasing the code runtime of a process. In aspects, unconventional prologue and epilogue steps of the present invention add new functionality to superscalar multiprocessors, resulting in automatic iterative optimization of a code process over time through a series of incremental improvements to prefetch functions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
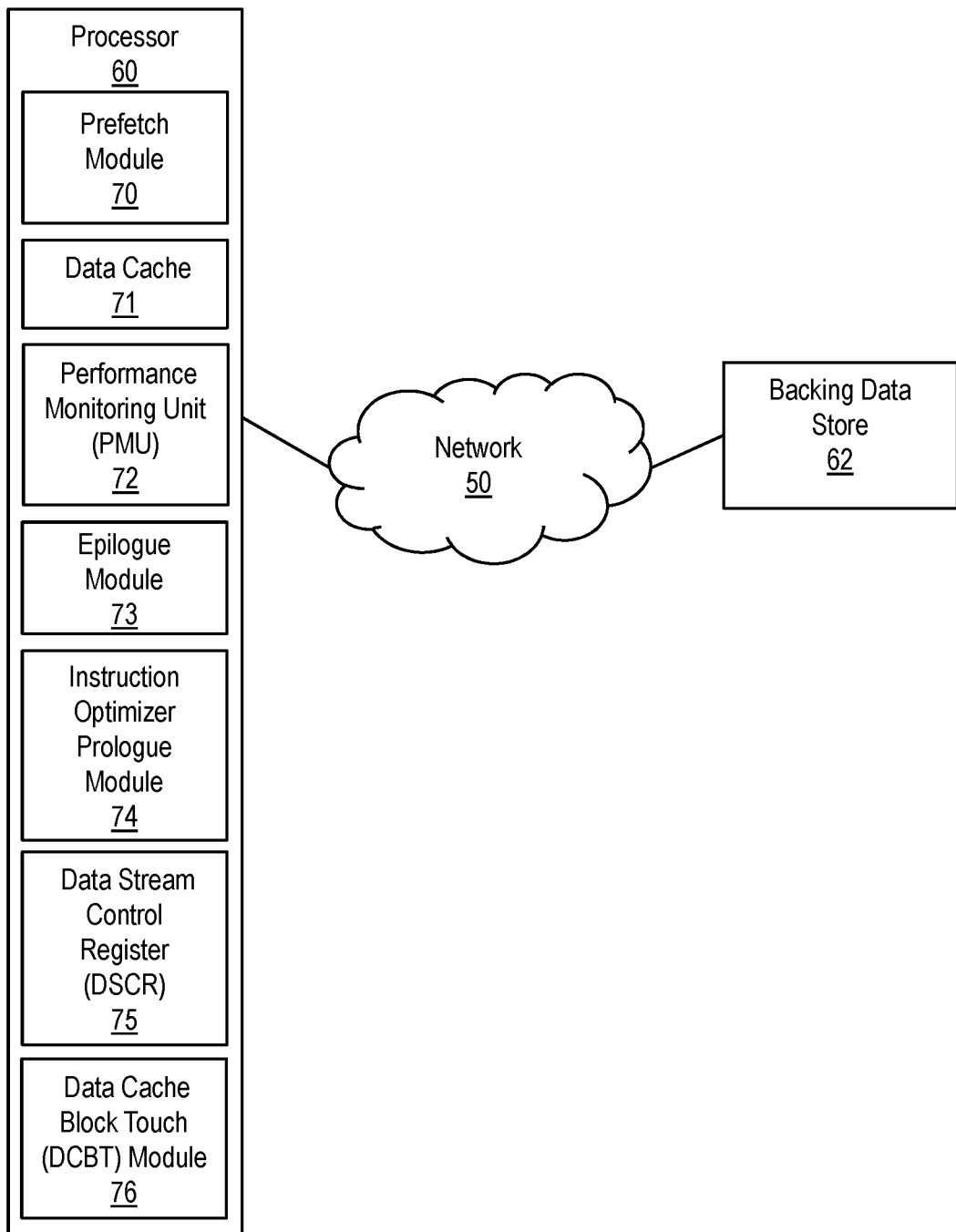
FIG. 2 shows an exemplary environment in accordance with aspects of the invention.

FIG. 2 shows an exemplary environment in accordance with aspects of the invention. In embodiments, the environment includes a network 50 connecting a processor 60 to a backing data store 62. The processor 60 may comprise a computer system 12 of FIG. 1, and may be connected to the network 50 via the network adapter 20 of FIG. 1. The processor 60 may be configured as a superscalar symmetric multiprocessor. One example of a processor 60 for use with the present invention is an International Business Machines (IBM) Power8 Processor™.

The network 50 may be any suitable communication network or combination of networks, such as a local area network (LAN), a general wide area network (WAN), and/or a public network (e.g., the Internet). The backing data store 62 may be in the form of a computing device such as the computing device 12 of FIG. 1, or a special purpose data storage device.

Still referring to FIG. 2, the processor 60 includes one or more modules configured to perform one or more of the functions described herein, wherein each module may include one or more program modules (e.g., program modules 42 of FIG. 1). In embodiments, the processor 60 includes a prefetch module 70 configured to fetch data and/or instructions to a data cache 71 before they are needed during a process running on the processor 60. Various types of prefetch tools and techniques may be utilized by the prefetch module 70. Similarly, various types of data caches may be utilized by the processor 60. In aspects, the processor 60 includes a performance monitoring unit (PMU) 72 configured to collect statistical data during the running of a process, including "cache miss" data. As used herein, a cache miss occurs when data requested by the processor 60 during execution of a process cannot be found in the data cache 71. Various performance monitoring tools and techniques may be utilized by the PMU 72 of the processor 60. In embodiments, the processor 60 further includes an epilogue module 73 configured to update metadata of an executed process based on statistical data from the PMU 72.

In embodiments, the processor 60 includes an instruction optimizer prologue module 74 (hereafter prologue module 74) configured to modify settings of a data stream control register (DSCR) 75 of the processor 60 prior to the running of a process. In aspects, the DSCR 75 is utilized by the processor 60 to control the degree of aggressiveness of memory prefetching for load and store operations by the prefetch module 70. In embodiments, the prologue module 74 is configured to increase default prefetch depth (DPFD) bits in the DSCR 75 if metadata of a process indicates cache misses were less than a predefined threshold value. Conversely, the prologue module 74 is configured to decrease default prefetch depth (DPFD) bits in the DSCR 75 if metadata of the process indicates cache misses where more than a predefined threshold value. In embodiments, the prologue module 74 is configured to receive instructions from a user to turn the prologue module 74 on or off prior to the running of a process. In aspects, the prologue module 74 in configured to determine which data is most likely to be required in an upcoming processing cycle, and automatically set hints at a data cache block touch (DCBT) module 76 of the processor 60 describing which memory block(s) the upcoming process is most likely to load or is most likely to no longer use based on the metadata of the process scheduled for execution. In embodiments, the DCBT module 76 includes instructions for enabling a program to request a cache block fetch before it is actually needed by the program.

In embodiments, the processor 60 may include additional or fewer components than those shown in FIG. 2. In embodiments, separate components may be integrated into a single computing component or module. Additionally, or alternatively, a single component may be implemented as multiple computing components or modules.

Figure 3:
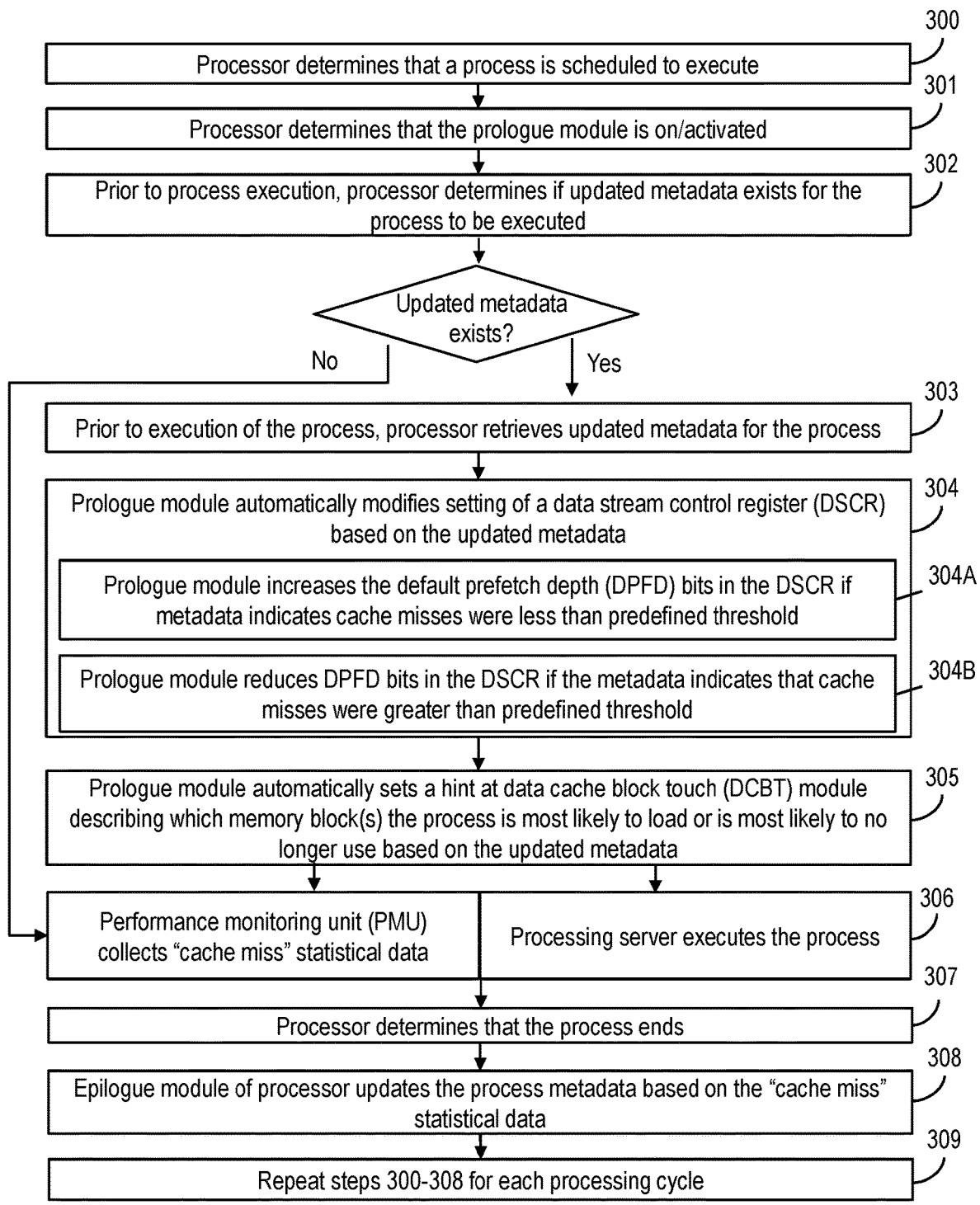
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the processor 60 determines that a process is scheduled to be executed by the processor 60. The term process as used herein refers to a process defined by program code, which includes a plurality of central processing unit (CPU) cycles or loading cycles. A variety of standard techniques may be utilized by the processor 60 in the implementation of step 300. For the purpose of a prologue phase of the present invention discussed with reference to steps 301-305 below, the process scheduled to be executed is hereafter referred to as the scheduled process.

At step 301, the processor 60 determines that the prologue module 74 is on, and can proceed with a prologue phase. Alternatively, if the processor 60 determines that the prologue module 74 is off, the processor 60 may proceed with executing the scheduled process in a conventional manner. In aspects, a user can turn the prologue module 74 on or off utilizing a graphical user interface (GUI) or other method of initiating prologue phase through the prologue module 74.

At step 302, the processor 60 determines if the scheduled process includes associated updated metadata. Step 302 occurs before execution of the scheduled process during the prologue phase. The term updated metadata as used herein refers to metadata associated with the scheduled process, which has been updated by the epilogue module 73 of the present invention in accordance with method step 307 discussed below. If the processor 60 determines that updated metadata exists for a scheduled process at step 302, the processor proceeds with the prologue phase at step 303. If the processor 60 determines that updated metadata does not exist for the scheduled process, the processor 60 proceeds to step 306, which is described in more detail below.

At step 303, the processor 60 retrieves updated metadata for the scheduled process from memory, prior to the execution of the scheduled process. A variety of existing metadata retrieval techniques may be utilized by the processor in the implementation of step 303.

At step 304, the prologue module 74 automatically modifies settings of the data stream control register (DSCR) based on the updated metadata retrieved at step 303. Step 304 also occurs prior to the execution of the scheduled process. Substeps 304A and 304B may be utilized in the implementation of step 304.

At substep 304A, the prologue module 74 increases the default prefetch depth (DPFD) bits in the DSCR if the updated metadata of step 303 indicates cache misses where less than a predefined threshold value. In other words, the prologue module 74 determines if the cache misses in the updated metadata are less than a predetermined value, and if they are, increases the DPFD bits in the DSCR.

At substep 304B, the prologue module 74 decreases or reduces the DPFD bits in the DSCR if the updated metadata of step 303 indicates cache misses where greater than a predefined threshold value. In other words, the prologue module 74 determines if the cache misses in the updated metadata are greater than a predetermined value, and if they are, reduces the DPFD bits in the DSCR.

At step 305, the prologue module 74 automatically sets a hint(s) at the data cache block touch (DCBT) module 76, wherein the hint(s) describe which memory blocks the scheduled process is most likely to load or is most likely to no longer used based on the updated metadata of step 303. Step 305 occurs during the prologue phase before execution of the scheduled process. In embodiments, the prefetch module 70 is in communication with the prologue module 74, wherein the DCBT module 76 includes instructions for enabling the scheduled program to request a cache block fetch through the prefetch module 70 before it is actually needed by the scheduled program.

At step 306, the dual functions of executing the scheduled process and monitoring the processing cycles of the process after execution are performed. In aspects, the prologue phase of the processor 60 ends, and the processor 60 executes the scheduled program at step 306. Concurrently, the performance monitoring unit (PMU) of the processor 60 collects cache miss statistical data of the process during the execution of the process. Typically, once a process is executed, the resulting loading of data into registers of the processor 60 may take several CPU cycles to be completed. The prefetch module 70 may perform prefetch data caching during the execution of the process, wherein the DSCR and DCBT provide instructions and information for implementation of the prefetch data caching. Existing prefetch data caching techniques may be utilized in the implementation of step 306. Table 1 below provides an example of the number of cycles required for executing a process on a superscalar symmetric multiprocessor prior to the use of the improved data caching methods of the present invention.

TABLE 1

Exemplary process cycles for a superscalar symmetric multiprocessor

| Where the data is | Cycles to load |
| --- | --- |
| L1 Data Cache Latency | 3 cycles for simple access via pointer |
| L2 Cache Latency | 12 cycles |
| L3 Cache Latency | 27 cycles |
| L3-REMOTE Cache Latency | 130 cycles |
| RAM Latency | 27 cycles + 80 nanoseconds (including L3-GLOBAL access) |

At step 307, the processor 60 determines that the process executed at step 306 has ended. A variety of existing methods may be utilized by the processor 60 in the implementation of step 307.

At step 308, the epilogue module 73 of the processor 60 updates the metadata of the process executed at step 306 based on the cache miss statistical data gathered by the PMU at step 306, resulting in newly updated metadata. In aspects, the newly updated metadata contains different cache miss statistical data than is present in the updated metadata due to the automatic modifications to the DSCR and DCBT performed during steps 304 and 305 of the prologue phase. That is, modifications made to the DSCR and DCBT during the prologue phase may lead to improved prefetch data caching (e.g., by the prefetch module 70) during the execution of the scheduled process, thereby reducing data cache misses.

At step 309, steps 300-308 may be repeated for one or more processes to be executed by the processor 60. It should be understood that incremental improvements in prefetch data caching may be realized by the repeat utilization of the prologue phase and the epilogue phase of the present invention. In other words, incremental updates to the metadata of a process occur each time the process is scheduled to execute, resulting in optimized program code over time.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for improved process caching through iterative feedback. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
retrieving, by a computing device, updated metadata of a process to be executed by the computing device, wherein the updated metadata includes information regarding cache misses from a prior execution of the process;
automatically modifying, by the computing device, a setting of a data stream control register of the computing device based on the updated metadata;
automatically setting, by the computing device, a hint at a data cache block touch module of the computing device describing which memory block the computing device is most likely to load during the executing of the process based on the updated metadata;
performing, by the computing device, an initial execution of the process after the steps of retrieving the updated metadata, automatically modifying the setting of the data stream control register, and automatically setting the hint at the data cache block touch module; and
modifying, by the computing device, the updated metadata of the process after the execution of the process based on cache miss statistical data gathered during the execution of the process, to produce newly updated metadata.

2. The method of claim 1, wherein automatically modifying the setting of the data stream control register comprises increasing default prefetch depth bits in the data stream control register.

3. The method of claim 1, wherein automatically modifying the setting of the data stream control register comprises:
determining that cache misses from the prior execution are greater than a predefined threshold value based on the updated metadata; and
decreasing default prefetch depth bits in the data stream control register based on the determining.

4. The method of claim 1, further comprising determining, by the computing device, that the process is scheduled to be executed by the computing device.

5. The method of claim 1, further comprising collecting, by the computing device, the cache miss statistical data during the execution of the process.

6. The method of claim 1, further comprising:
retrieving, by a computing device, the newly updated metadata of the process;
automatically modifying, by the computing device, a setting of the data stream control register of the computing device based on the newly updated metadata;
automatically setting, by the computing device, a hint at the data cache block touch module of the computing device describing which memory block the computing device is most likely to load during an executing of the process based on the newly updated metadata; and
performing, by the computing device, a subsequent execution of the process after the steps of retrieving the newly updated metadata, automatically modifying the setting of the data stream control register based on the newly updated metadata, and automatically setting the hint at the data cache block touch module based on the newly updated metadata, wherein a runtime of the process during the subsequent execution is shorter than a runtime of the process during the initial execution.

7. The method of claim 6, further comprising modifying, by the computing device, the newly updated metadata of the process after the subsequent execution of the process based on cache miss statistical data gathered during the subsequent execution of the process.

8. A computer program product for improved process caching through iterative feedback, the computer program product comprising a computer readable storage medium having program instructions embodied therewith, the program instructions executable by a computing device to cause the computing device to:
perform an initial execution of a process;
collect a first set of cache miss statistical data for the process during the initial execution of the process;
modify metadata of the process, after the execution of the process, based on the cache miss statistical data to produce updated metadata;
automatically modify a setting of a data stream control register of the computing device based on the updated metadata;
automatically set a hint at a data cache block touch module of the computing device describing which memory block the computing device is most likely to load during the executing of the process based on the updated metadata;
perform a subsequent execution of the process after the steps of automatically modifying the setting of the data stream control register and automatically setting the hint at the data cache block touch module; and
modify the updated metadata of the process after the subsequent execution of the process based on a second set of cache miss statistical data gathered during the subsequent execution of the process, to produce newly updated metadata.

9. The computer program product of claim 8, wherein automatically modifying the setting of the data stream control register comprises increasing default prefetch depth bits in the data stream control register based on the determining.

10. The computer program product of claim 8, wherein automatically modifying the setting of the data stream control register comprises:
determining that cache misses from the initial execution are greater than a predefined threshold value based on the updated metadata; and
decreasing default prefetch depth bits in the data stream control register based on the determining.

11. The computer program product of claim 8, wherein the program instructions further cause the computing device to determine that the process is scheduled for the subsequent execution by the computing device, wherein the program instructions cause the computing device to automatically modify the setting of the data stream control register and automatically set the hint at the data cache block touch module based on the determining that the process is scheduled for the subsequent execution.

12. The computer program product of claim 8, wherein the program instructions further cause the computing device to:
collect the first set of cache miss statistical data during the initial execution of the process; and
collect the second set of cache miss statistical data during the subsequent execution of the process.

13. The computer program product of claim 8, wherein a runtime of the process during the subsequent execution is shorter than a runtime of the process during the initial execution.

14. A system for improved process caching through iterative feedback, comprising:
a CPU, a computer readable memory and a computer readable storage medium associated with a computing device;
program instructions to determine that a prologue module is activated;

program instructions to retrieve updated metadata of a process to be executed by the computing device, wherein the updated metadata includes information regarding cache misses from a prior execution of the process;

program instructions to automatically modify, by the prologue module of the computing device, a setting of a data stream control register of the computing device based on the updated metadata;

program instruction to automatically set, by the prologue module, a hint at a data cache block touch module of the computing device describing which memory block the computing device is most likely to load during the executing of the process based on the updated metadata;

program instructions to perform an initial execution of the process after the steps of retrieving the updated metadata, automatically modifying the setting of the data stream control register, and automatically setting the hint at the data cache block touch module; and program instructions to modify, by an epilogue module of the computing device, the updated metadata of the process after the execution of the process based on cache miss statistical data gathered during the execution of the process, to produce newly updated metadata, wherein the program instructions are stored on the computer readable storage medium for execution by the CPU via the computer readable memory.

15. The system of claim 14, wherein automatically modifying the setting of the data stream control register comprises increasing default prefetch depth bits in the data stream control register based on the determining.

16. The system of claim 14, wherein automatically modifying the setting of the data stream control register comprises:
determining that cache misses from the prior execution are greater than a predefined threshold value based on the updated metadata; and
decreasing default prefetch depth bits in the data stream control register based on the determining.

17. The system of claim 14, further comprising program instructions to determine that the process is scheduled to be executed by the computing device.

18. The system of claim 14, further comprising program instructions to collect, by a performance monitoring unit of the computing device, the cache miss statistical data during the execution of the process.

19. The system of claim 14, further comprising:
program instructions to retrieve the newly updated metadata of the process;
program instructions to automatically modify, by the prologue module, a setting of the data stream control register of the computing device based on the newly updated metadata;
program instructions to automatically set, by the prologue module, a hint at the data cache block touch module of the computing device describing which memory block the computing device is most likely to load during an executing of the process based on the newly updated metadata; and
program instructions to perform a subsequent execution of the process after the steps of retrieving the newly updated metadata, automatically modifying the setting of the data stream control register based on the newly updated metadata, and automatically setting the hint at the data cache block touch module based on the newly updated metadata, wherein a runtime of the process during the subsequent execution is shorter than a runtime of the process during the initial execution.

20. The system of claim 19, further comprising program instructions to modify, by the epilogue module, the newly updated metadata of the process after the subsequent execution of the process based on cache miss statistical data gathered during the subsequent execution of the process.

* * * * *